United States Patent
Chikuri (10) Patent No.: US 8,195,461 B2
(45) Date of Patent: Jun. 5, 2012

(54) VOICE RECOGNITION SYSTEM

(75) Inventor: Takayoshi Chikuri, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 496 days.

(21) Appl. No.: 12/447,352

(22) PCT Filed: Oct. 4, 2007

(86) PCT No.: PCT/JP2007/069479
§ 371 (c)(1),
(2), (4) Date: Apr. 27, 2009

(87) PCT Pub. No.: WO2008/072413
PCT Pub. Date: Jun. 19, 2008

(65) Prior Publication Data
US 2010/0076751 A1    Mar. 25, 2010

(30) Foreign Application Priority Data
Dec. 15, 2006   (JP) .................................. 2006-338813

(51) Int. Cl.
G10L 15/04    (2006.01)
G10L 15/26    (2006.01)
G10L 11/00    (2006.01)
G06F 3/16     (2006.01)

(52) U.S. Cl. ........ 704/252; 704/235; 704/251; 704/270; 715/727

(58) Field of Classification Search .................. None
See application file for complete search history.

(56) References Cited

U.S. PATENT DOCUMENTS

| 5,797,116 | A  | * | 8/1998  | Yamada et al. ................. 704/10  |
| 6,434,524 | B1 |   | 8/2002  | Weber                                   |
| 6,836,822 | B1 | * | 12/2004 | Hatano et al. ................. 711/117 |
| 7,020,612 | B2 | * | 3/2006  | Tamura ......................... 704/275 |
| 7,437,296 | B2 | * | 10/2008 | Inoue et al. .................... 704/275 |
| 7,496,508 | B2 | * | 2/2009  | Krass et al. .................... 704/243 |
| 7,813,928 | B2 | * | 10/2010 | Okimoto et al. .............. 704/251   |
| 2002/0032568 | A1 | * | 3/2002 | Saito .............................. 704/246 |
| 2002/0046027 | A1 | * | 4/2002 | Tamura ......................... 704/250   |
| 2005/0144011 | A1 |   | 6/2005 | Kawana                                  |
| 2010/0114577 | A1 |   | 5/2010 | Hayn et al.                             |

FOREIGN PATENT DOCUMENTS

| DE | 102004059372 A1 | 7/2005  |
| DE | 69922971     T2 | 12/2005 |
| DE | 102006029755 A1 | 1/2008  |
| JP | 9-42988       A | 2/1997  |

(Continued)

*Primary Examiner* — Brian Albertalli
(74) *Attorney, Agent, or Firm* — Birch, Stewart, Kolasch & Birch, LLP (57) ABSTRACT

A voice recognition system used for onboard equipment having a genre database (DB) that stores search target vocabularies in accordance with respective genres. It has a mike 1 for outputting speech sounds as spoken data; a first voice recognition dictionary 2a for recognizing words of search target genres in the genre DB; a second voice recognition dictionary 2b for recognizing words outside the search target genres; a voice recognition unit 3 for recognizing the speech sounds by collating the spoken data delivered from the mike with the vocabularies contained in the first and second voice recognition dictionaries; an interactive control unit 4 for outputting, when a word delivered from the voice recognition unit as a recognition result is a word obtained using the second voice recognition dictionary, a message so stating as presentation information; and a presentation unit 5 for presenting the presentation information to an outside.

11 Claims, 8 Drawing Sheets

FOREIGN PATENT DOCUMENTS

| | | |
|---|---|---|
| JP | 9-230889 A | 9/1997 |
| JP | 11-202891 A | 7/1999 |
| JP | 2000-75887 A | 3/2000 |
| JP | 2002-215186 A | 7/2002 |
| JP | 2002-366578 A | 12/2002 |
| JP | 2003-91297 A | 3/2003 |
| JP | 2004-13108 A | 1/2004 |
| JP | 2004-333729 A | 11/2004 |
| JP | 2005-44071 A | 2/2005 |
| JP | 2006-23572 A | 1/2006 |

* cited by examiner

VOICE RECOGNITION SYSTEM

TECHNICAL FIELD

The present invention relates to a voice recognition system for recognizing speech sounds, and particularly to a technique for reducing a problem involved in misrecognition of the speech.

BACKGROUND ART

Conventionally, a car navigation system has been known which can issue various instructions using voice recognition. Although a car navigation system without using the voice recognition makes genre specification by selecting from a menu displayed, the car navigation system using the voice recognition can specify the genre by speaking a genre name or the like, for example, even if the menu is invisible such as during driving.

Since the voice recognition is a technique capable of recognizing only the vocabulary recorded in a voice recognition dictionary in advance, it is necessary for a user to pronounce the word representing the genre correctly when inputting for the voice recognition. However, since the number of genres to be searched in the car navigation system generally amounts to several tens, it is difficult for the user to memorize the genres available in the car navigation system. In addition, it is difficult to distinguish the genres available in the car navigation system from genres the user sees in everyday life such as in yellow pages or the Internet or from genres available in other car navigation systems.

As a relevant technique, Patent Document 1 discloses a voice recognition system capable of good voice recognition even if an input object such as a facility name is pronounced rather inaccurately. In the voice recognition system, a map data storage means stores formal names of facilities as basic words. In a voice recognition unit, derivative key character strings in a basic word are detected, and the basic word is changed in part using the key character strings. Thus, a derivative word representing the same facility as the basic word in another expression is generated automatically. For example, a basic word "Shizuoka Prefectural Susono High School" includes key character strings "Shizuoka Prefectural" and "High School". Then, derivative words such as "Susono High School" and "Susono Senior High" are generated. The voice recognition is carried out by applying such a derivative word or basic word to an object of recognition. Accordingly, it is sufficient to store one word for each object. Patent Document 1: Japanese Patent Laid-Open No. 11-202891/1999.

As for the conventional voice recognition system applied to the car navigation system, although it has the foregoing problem, it stores in its voice recognition dictionary only the vocabulary expressing retrievable genres as a function of the car navigation system. Accordingly, if the user utters a word representing a genre unavailable in the car navigation system, it will mistake the word for another word, which causes a problem in that the car navigation system operates in a manner different from that the user intends.

The present invention is implemented to solve the foregoing problem. Therefore it is an object of the present invention to provide a voice recognition system capable of preventing a system working in response to the recognition from operating in a manner different from that the user intends.

DISCLOSURE OF THE INVENTION

To accomplish the foregoing object, the voice recognition system in accordance with the present invention is a voice recognition system used for onboard equipment having a genre database that stores search target vocabularies in accordance with respective genres, the voice recognition system including: a microphone for converting speech sounds to an electric signal, and for outputting the electric signal as spoken data; a first voice recognition dictionary used for recognizing words of a search target genre in the genre database; a second voice recognition dictionary used for recognizing words outside the search target genre in the genre database; a voice recognition unit for recognizing the speech sounds by collating the spoken data delivered from the microphone with the words contained in the first voice recognition dictionary and in the second voice recognition dictionary; an interactive control unit for outputting, when a word delivered from the voice recognition unit as a recognition result is a word obtained by collating with the words contained in the second voice recognition dictionary, a message stating that the word is not a word of the search target genre as presentation information; and a presentation unit for presenting the presentation information delivered from the interactive control unit to an outside.

The voice recognition system in accordance with the present invention is configured in such a manner as to have the second voice recognition dictionary used for recognizing words outside the search target genres in the genre database in addition to the first voice recognition dictionary used for recognizing words of the search target genres in the genre database; to recognize the speech sounds by using the spoken data and the first voice recognition dictionary and the second voice recognition dictionary; and to present, when a recognition result is obtained from the second voice recognition dictionary, a message stating that the word is not a word of the search target genres. Accordingly, even if a word unsearchable in the genre database is spoken, the voice recognition system can correctly recognize the spoken word. As a result, it can eliminate a problem in that the car navigation system carries out operation different from that the user intends because of misrecognition for another word. In addition, when the recognition result obtained from the second voice recognition dictionary, since the message so stating is presented, the user can use the voice recognition functions without any uncomfortable feeling.

BEST MODE FOR CARRYING OUT THE INVENTION

The best mode for carrying out the invention will now be described with reference to the accompanying drawings to explain the present invention in more detail. Incidentally, in the following, cases will be described in which a voice recognition system of an embodiment in accordance with the present invention is applied to a car navigation system as onboard equipment.

Embodiment 1

Figure 1:
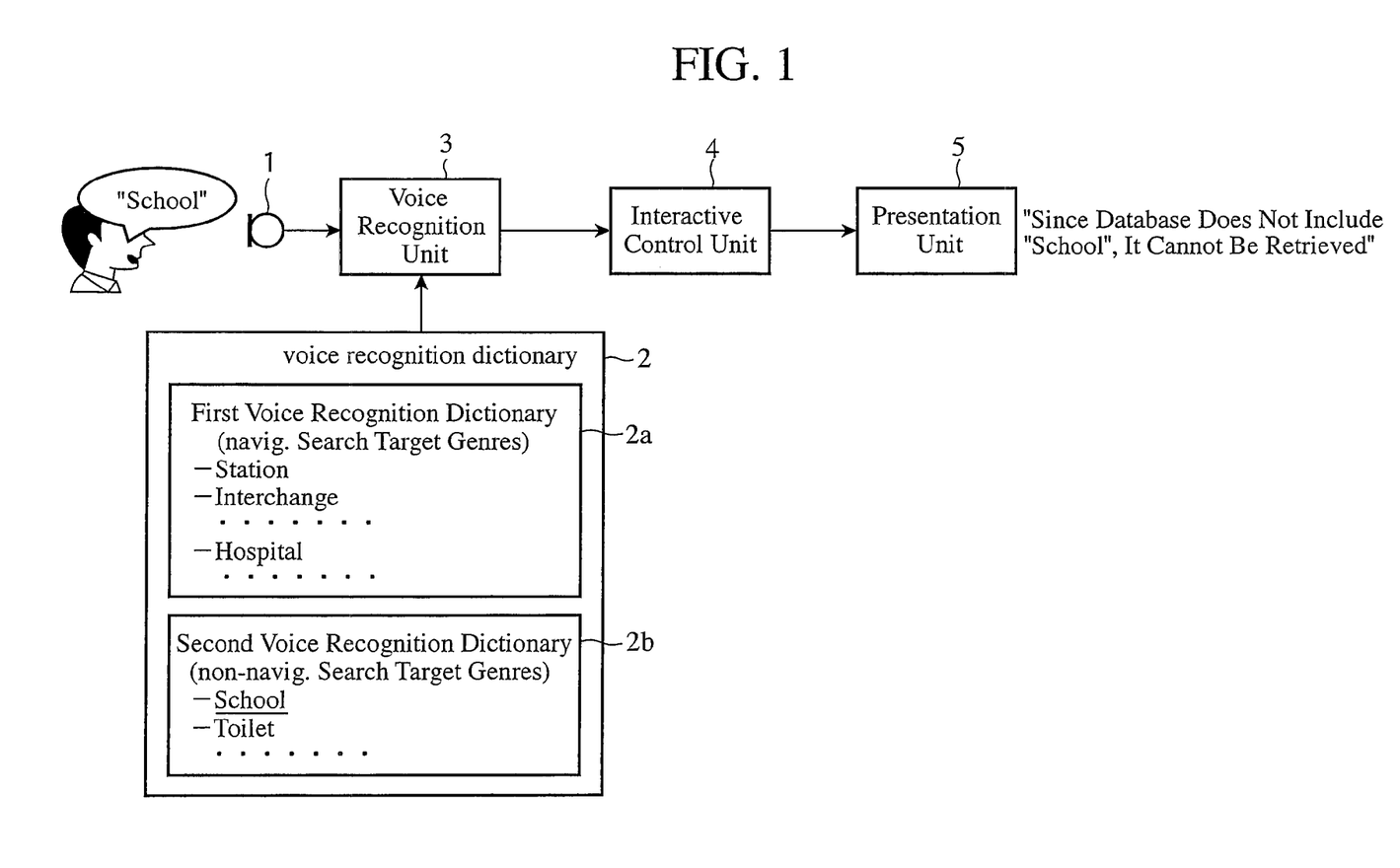
FIG. 1 is a block diagram showing a configuration of a car navigation system to which a voice recognition system of an embodiment 1 in accordance with the present invention is applied.

FIG. 1 is a block diagram showing a configuration of a voice recognition system of an embodiment 1 in accordance with the present invention. The voice recognition system comprises a microphone (referred to as a "mike" from now on) 1, a voice recognition dictionary 2, a voice recognition unit 3, an interactive control unit 4 and a presentation unit 5. As for a car navigation system to which the voice recognition system is applied, although not shown in the drawings, it has a genre database that stores search target vocabulary for each genre as a retrieval database.

The mike 1 converts the speech a user utters to an electric signal, and delivers to the voice recognition unit 3 as spoken data. The voice recognition dictionary 2 consists of a first voice recognition dictionary 2a and a second voice recognition dictionary 2b. The first voice recognition dictionary 2a stores vocabularies of genres that will become a search target of the car navigation system (referred to as "navig. search target genre" from now on), that is, words of a search target genre in a genre database (such as stations, interchanges and hospitals). The second voice recognition dictionary 2b stores vocabularies of genres outside the search target of the navigation system (referred to as "non-navig. search target genre" from now on), that is, vocabularies of genres that will not become a search target in the genre database (such as schools and toilets).

The voice recognition unit 3 retains the spoken data delivered from the mike 1, and recognizes the speech the user utters by comparing the retained spoken data with the vocabularies stored in the voice recognition dictionary 2 (first voice recognition dictionary 2a and second voice recognition dictionary 2b). The recognition result by the voice recognition unit 3 is delivered to the interactive control unit 4.

The interactive control unit 4 outputs, when the recognition result delivered from the voice recognition unit 3 indicates that the recognition is made by comparing with the vocabularies contained in the first voice recognition dictionary 2a, the recognized word; and outputs, when it indicates that the recognition is made by comparing with the vocabularies contained in the second voice recognition dictionary 2b, a message stating that. Thus, the conversational interaction with the user is controlled. The word or message output from the interactive control unit 4 is delivered to the presentation unit 5.

The presentation unit 5 consists of a speaker, for example, and outputs the word or message delivered from the interactive control unit 4 in speech. The presentation unit 5 can also consist of a display. In this case, the word or message delivered from the interactive control unit 4 is displayed on the screen of the display. The presentation unit 5 can also consist of both the speaker and display.

Figure 2:
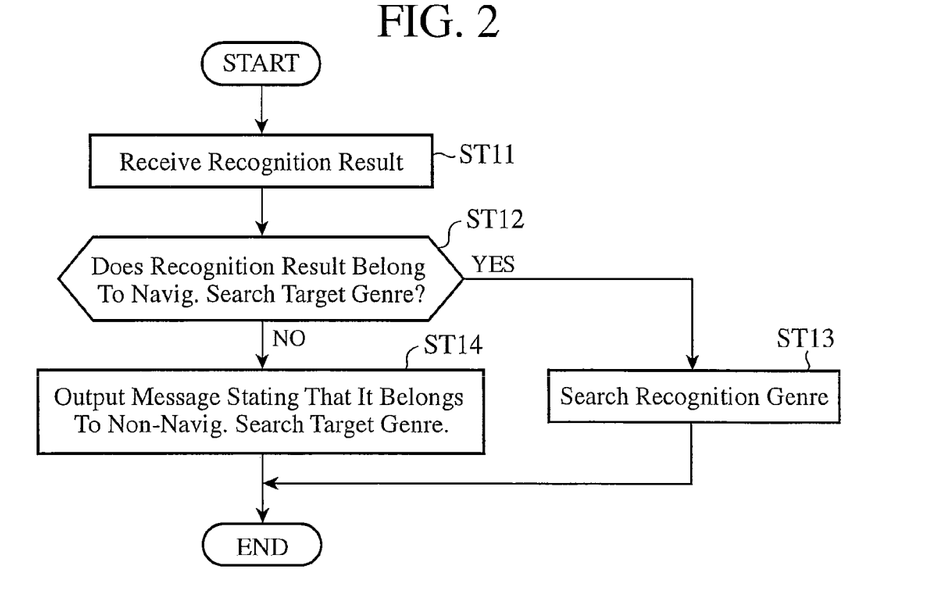
FIG. 2 is a flowchart showing the operation of the voice recognition system of the embodiment 1 in accordance with the present invention centering on interactive control processing.

Next, with reference to the flowchart shown in FIG. 2, the operation of the voice recognition system of the embodiment 1 in accordance with the present invention with the foregoing configuration will be described centering on the interactive control processing executed by the interactive control unit 4.

In the interactive control processing, the recognition result is received, first (step ST11). In other words, the interactive control unit 4 receives the recognition result delivered from the voice recognition unit 3. Subsequently, a decision is made as to whether the recognition result received at step ST11 indicates a word of the navig. search target genre or not (step ST12). More specifically, the interactive control unit 4 checks whether the recognition result is obtained by comparing with the vocabularies contained in the first voice recognition dictionary 2a or by comparing with the vocabularies contained in the second voice recognition dictionary 2b.

If a decision is made at step ST12 that the recognition result indicates a word of the navig. search target genre, a recognition genre search is conducted (step ST13). More specifically, the control unit of the car navigation system not shown searches the genre database using the word obtained by the voice recognition as a retrieval key. After that, the operation of the voice recognition system is completed.

On the other hand, unless a decision is made at step ST12 that the recognition result indicates a word of the navig. search target genre, a message so stating is output (step ST14). More specifically, the interactive control unit 4 generates a message that the spoken word is not contained in the genre database, and delivers it to the presentation unit 5. This will allow the presentation unit 5 to output the message it receives from the interactive control unit 4 from the speaker in speech or to display the message on the display screen in characters. After that, the operation of the voice recognition system is completed.

A concrete example carried out by the foregoing processing will be described. For example, if a word "school" of a genre not stored in the genre database of the car navigation system is spoken, the voice recognition unit 3 recognizes the word "school" correctly using the second voice recognition dictionary 2b and delivers the recognition result to the interactive control unit 4. Receiving the recognition result, the interactive control unit 4 generates a message stating that "Since the word "school" is not contained in the database, it cannot be searched for" and delivers it to the presentation unit 5. This allows the presentation unit 5 to present the message to the user in speech or characters.

As described above, according to the voice recognition system of the embodiment 1 in accordance with the present invention, even if a word is spoken which cannot be retrieved from the genre database of the car navigation system, the voice recognition system can recognize the spoken word correctly. Accordingly, it can eliminate the problem in that the car navigation system carries out operation different from that the user intends because of misrecognition for another word.

Embodiment 2

Figure 3:
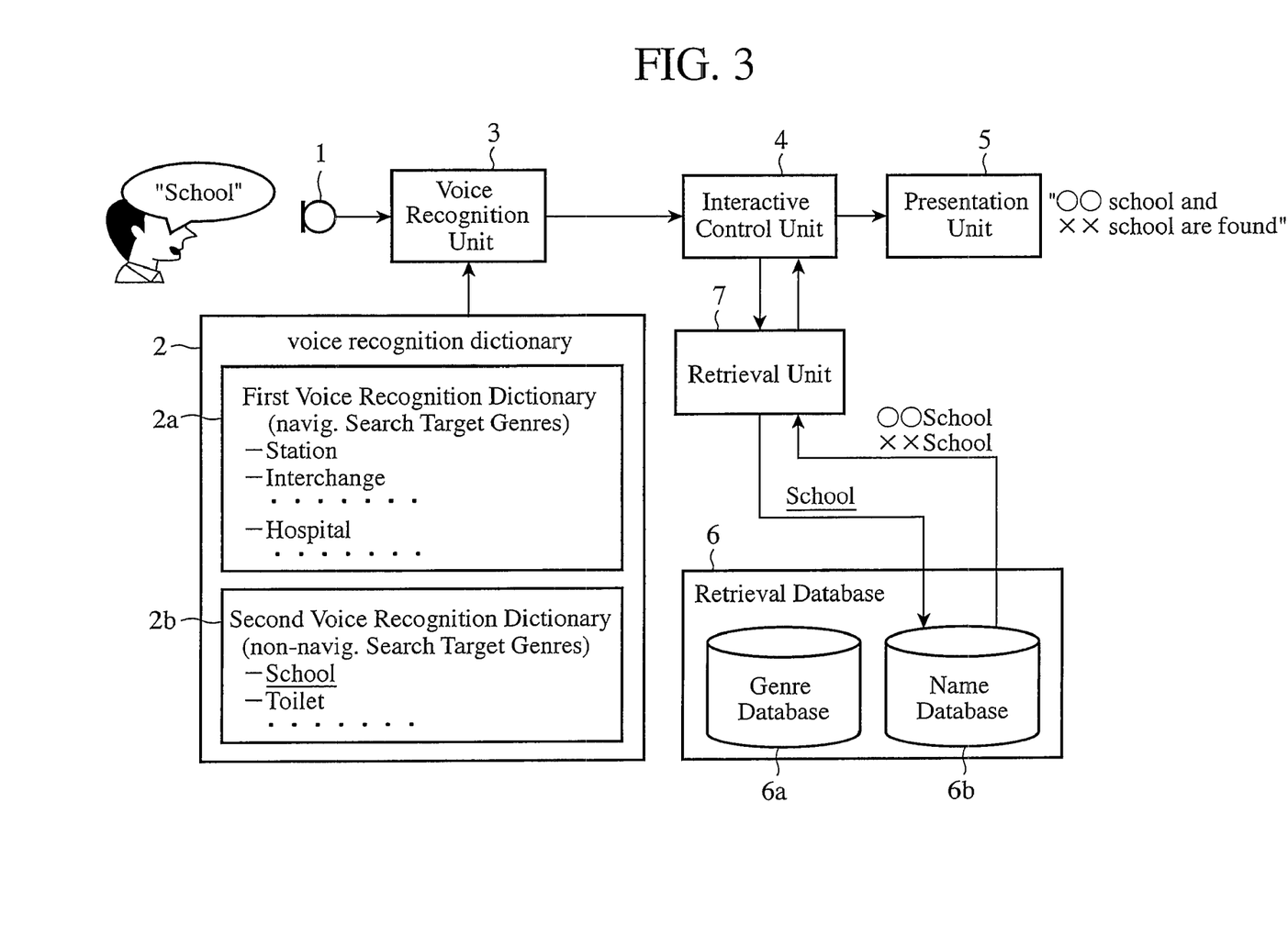
FIG. 3 is a block diagram showing a configuration of a car navigation system to which a voice recognition system of an embodiment 2 in accordance with the present invention is applied.

FIG. 3 is a block diagram showing a configuration of the voice recognition system of an embodiment 2 in accordance with the present invention. The voice recognition system is configured by adding a retrieval database 6 and a retrieval unit 7 to the voice recognition system of the embodiment 1. It will be described below centering on portions different from the embodiment 1.

The retrieval database 6 comprises a genre database 6a and a name database 6b. The genre database 6a stores for each genre the vocabulary that is made a search target in the car navigation system in the same manner as in the embodiment 1. In addition, the name database stores names retrievable by the car navigation system independently of the genre. The retrieval unit 7 searches the retrieval database 6 in accordance with an instruction from the interactive control unit 4, and delivers a word obtained by the search to the interactive control unit 4.

Figure 4:
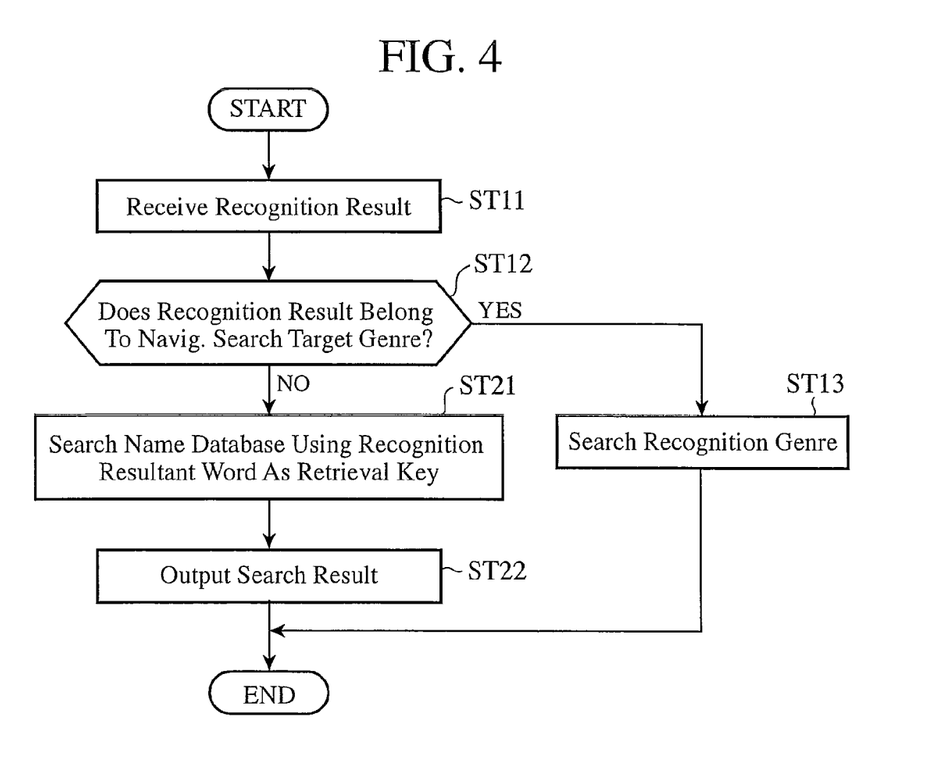
FIG. 4 is a flowchart showing the operation of the voice recognition system of the embodiment 2 in accordance with the present invention centering on interactive control processing.

Next, the operation of the voice recognition system of the embodiment 2 in accordance with the present invention with the foregoing configuration will be described with reference to the flowchart of FIG. 4 centering on the interactive control processing executed by the interactive control unit 4. Incidentally, as for the steps executing the same processing as those of the voice recognition system of the embodiment 1, they are designated by the same reference symbols and their description will be simplified.

In the interactive control processing, the recognition result is received, first (step ST11). Subsequently, a check is made as to whether the recognition result received at step ST11 indicates a word belonging to the navig. search target genre or not (step ST12). If a decision is made at step ST12 that the recognition result indicates a word belonging to the navig. search target genre, the recognition genre search is carried out (step ST13). After that, the operation of the voice recognition system is completed.

At the foregoing step ST12, unless a decision is made that the recognition result indicates a word belonging to the navig. search target genre, the name database is searched using the recognition resultant word as a retrieval key (step ST21). More specifically, the interactive control unit 4 delivers the recognition resultant word to the retrieval unit 7. Using the word received from the interactive control unit 4 as a retrieval key, the retrieval unit 7 searches the name database 6b in the retrieval database 6. Then, it sends the word obtained by the search back to the interactive control unit 4.

Subsequently, the search result is output (step ST22). More specifically, the interactive control unit 4 delivers the word received from the retrieval unit 7 as a result of the search to the presentation unit 5. This allows the presentation unit 5 to output from the speaker the word indicating the search result it receives from the interactive control unit 4 in speech or to display it on the display screen in characters. After that, the operation of the voice recognition system is completed.

A concrete example carried out by the foregoing processing will be described. For example, if a word "school" of a genre not stored in the genre database 6a of the car navigation system is spoken, the voice recognition unit 3 recognizes the word "school" correctly using the second voice recognition dictionary 2b and delivers the recognition result to the interactive control unit 4. Receiving the recognition result, the interactive control unit 4 instructs the retrieval unit 7 to search the name database 6b in the retrieval database 6 using the word "school" as a retrieval key. Searching the name database 6b, the retrieval unit 7 obtains words including the word "school" in their names such as "○○ school" and "xx school", and delivers them to the interactive control unit 4. The interactive control unit 4 generates a message "○○ school and xx school are found", for example, and delivers it to the presentation unit 5. This allows the presentation unit 5 to present the message to the user in speech or characters.

As described above, according to the voice recognition system of the embodiment 2 in accordance with the present invention, the following advantage is added to the advantage of the voice recognition system of the foregoing embodiment 1. More specifically, even if a word is spoken which cannot be retrieved from the genre database of the car navigation system, the voice recognition system searches the name database 6b prepared separately besides the genre database 6a using the word as a retrieval key, and can present the word obtained by the search to the user. Thus, if a word including the word "school" is contained in a genre different from the genre "school", the voice recognition system can present the word to the user, thereby offering an advantage of being able to carry out more detailed search.

Embodiment 3

Figure 5:
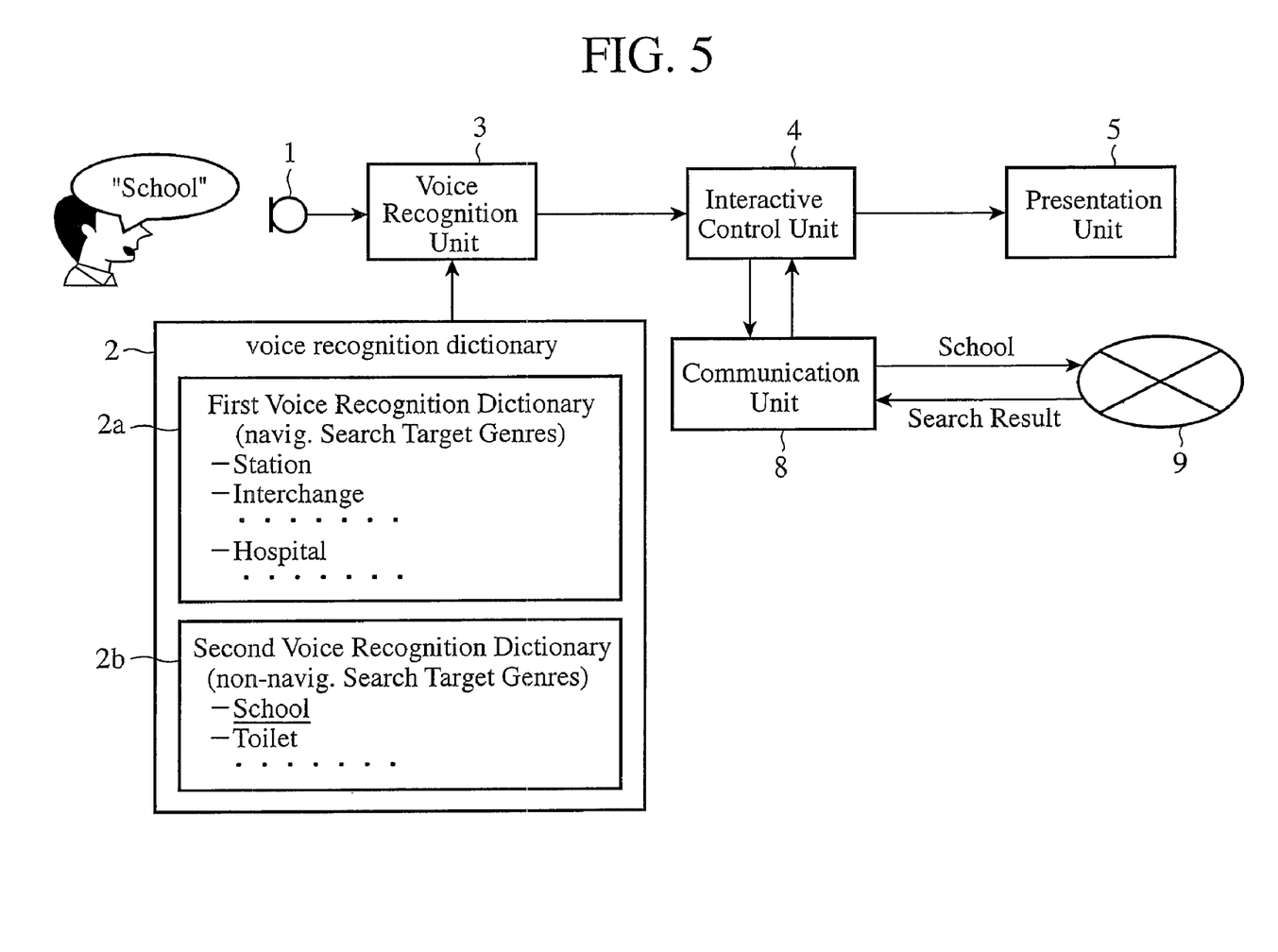
FIG. 5 is a block diagram showing a configuration of a car navigation system to which a voice recognition system of an embodiment 3 in accordance with the present invention is applied.

FIG. 5 is a block diagram showing a configuration of the voice recognition system of an embodiment 3 in accordance with the present invention. The voice recognition system is configured by adding a communication unit 8 to the voice recognition system of the embodiment 1. The communication unit 8 is connected to a network 9. It will now be described centering on portions different from the embodiment 1.

According to an instruction from the interactive control unit 4, the communication unit 8 searches a site on the network 9 using a network search engine, for example, and delivers words obtained by the search to the interactive control unit 4. As the network 9, the Internet can be used.

Figure 6:
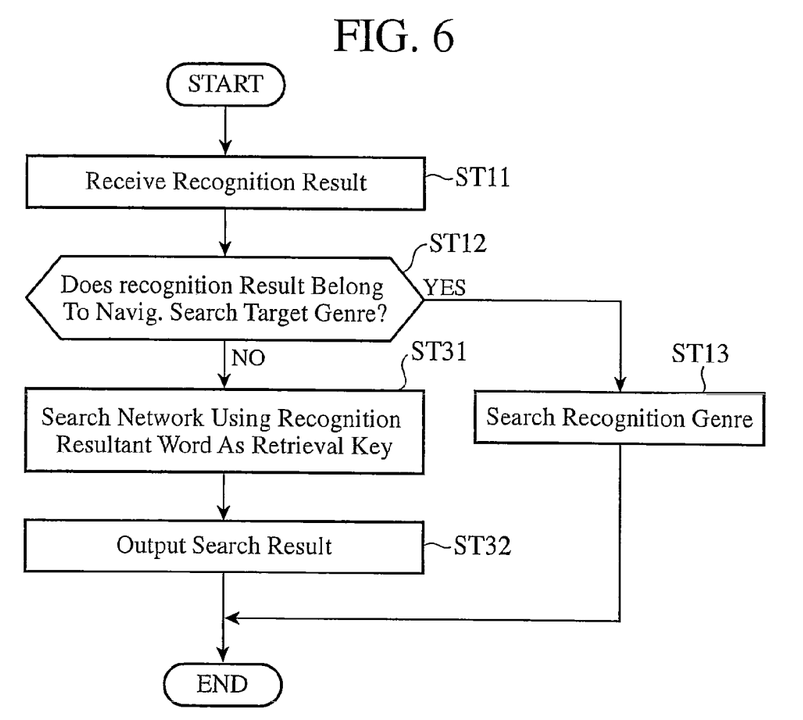
FIG. 6 is a flowchart showing the operation of the voice recognition system of the embodiment 3 in accordance with the present invention centering on interactive control processing.

Next, the operation of the voice recognition system of the embodiment 3 in accordance with the present invention with the foregoing configuration will be described with reference to the flowchart of FIG. 6 centering on the interactive control processing executed by the interactive control unit 4. Incidentally, as for the steps executing the same processing as those of the voice recognition system of the embodiment 1, they are designated by the same reference symbols and their description will be simplified.

In the interactive control processing, the recognition result is received, first (step ST11). Subsequently, a check is made as to whether the recognition result received at step ST11 indicates a word belonging to the navig. search target genre or not (step ST12). If a decision is made at step ST12 that the recognition result indicates a word belonging to the navig. search target genre, the recognition genre search is carried out (step ST13). After that, the operation of the voice recognition system is completed.

At the foregoing step ST12, unless a decision is made that the recognition result indicates a word belonging to the navig. search target genre, the network 9 is searched using the recognition resultant word as a retrieval key (step ST31). More specifically, the interactive control unit 4 delivers the recognition resultant word to the communication unit 8. Using the word received from the interactive control unit 4 as a retrieval key, the communication unit 8 searches the network 9 using the network search engine, for example. Then, it sends a word obtained by the search back to the interactive control unit 4.

Subsequently, the search result is output (step ST32). More specifically, the interactive control unit 4 delivers the word received from the communication unit 8 as a result of the search to the presentation unit 5. This allows the presentation unit 5 to output from the speaker the word indicating the search result it receives from the interactive control unit 4 in speech or to display it on the display screen in characters. After that, the operation of the voice recognition system is completed.

A concrete example carried out by the foregoing processing will be described. For example, if a word "school" of a genre not stored in the genre database 6*a* of the car navigation system is spoken, the voice recognition unit 3 recognizes the word "school" correctly using the second voice recognition dictionary 2*b* and delivers the recognition result to the interactive control unit 4. Receiving the recognition result, the interactive control unit 4 instructs the communication unit 8 to search the network 9 using the word "school" as a retrieval key. Searching the network 9, the communication unit 8 obtains words including the word "school" and delivers them to the interactive control unit 4. The interactive control unit 4 generates a message indicating the words including the "school" and delivers it to the presentation unit 5. This allows the presentation unit 5 to present the message to the user in speech or characters.

As described above, according to the voice recognition system of the embodiment 3 in accordance with the present invention, the following advantage is added to the advantage of the voice recognition system of the foregoing embodiment 1. More specifically, even if a word is spoken which cannot be retrieved from the genre database of the car navigation system, the voice recognition system searches the network 9 using the word as a retrieval key, and can present the word obtained by the search to the user. Thus, even if a word of a genre not stored in the genre database of the car navigation system is spoken, the voice recognition system offers an advantage of being able to present relevant information to the user.

Embodiment 4

Figure 7:
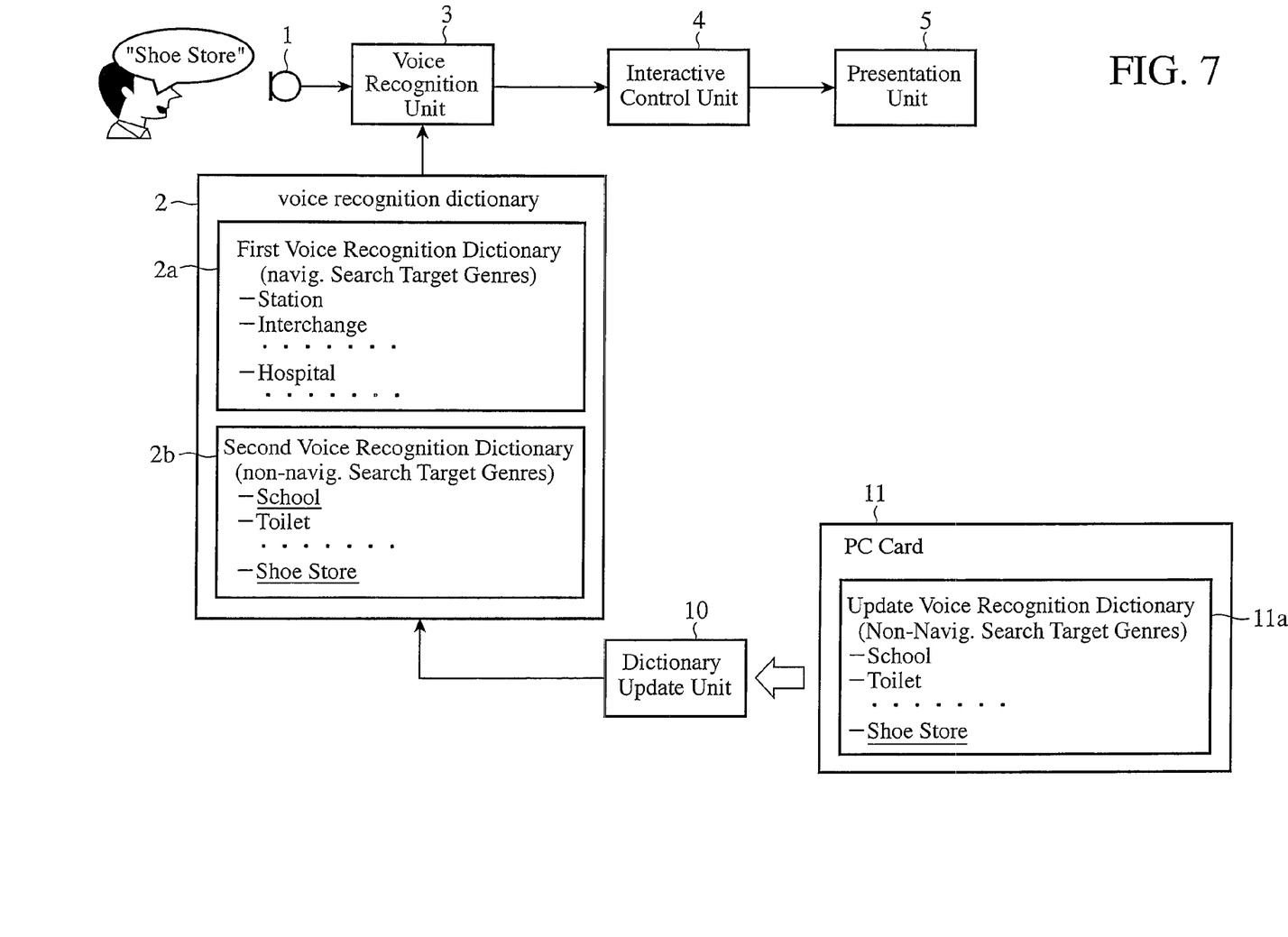
FIG. 7 is a block diagram showing a configuration of a car navigation system to which a voice recognition system of an embodiment 4 in accordance with the present invention is applied.

FIG. 7 is a block diagram showing a configuration of the voice recognition system of an embodiment 4 in accordance with the present invention. The voice recognition system is configured by adding a dictionary update unit 10 to the voice recognition system of the embodiment 1. The dictionary update unit 10 is loaded with a PC card 11. It will now be described centering on portions different from the embodiment 1.

The PC card 11 stores an update voice recognition dictionary 11*a* for updating the second voice recognition dictionary 2*b*. The update voice recognition dictionary 11*a*, which consists of the vocabularies outside the navig. search target genres that are beyond the search target in the car navigation system, stores the vocabulary obtained by adding to or deleting from the existing second voice recognition dictionary 2*b*. FIG. 7 shows an example of the update voice recognition dictionary 11*a* obtained by adding a new word "shoe store" to the second voice recognition dictionary 2*b* of the embodiment 1.

The dictionary update unit 10 replaces the existing second voice recognition dictionary 2*b* by the update voice recognition dictionary 11*a* read out of the PC card 11 when the PC card 11 is loaded, and employs it as a new second voice recognition dictionary 2*b*.

Figure 8:
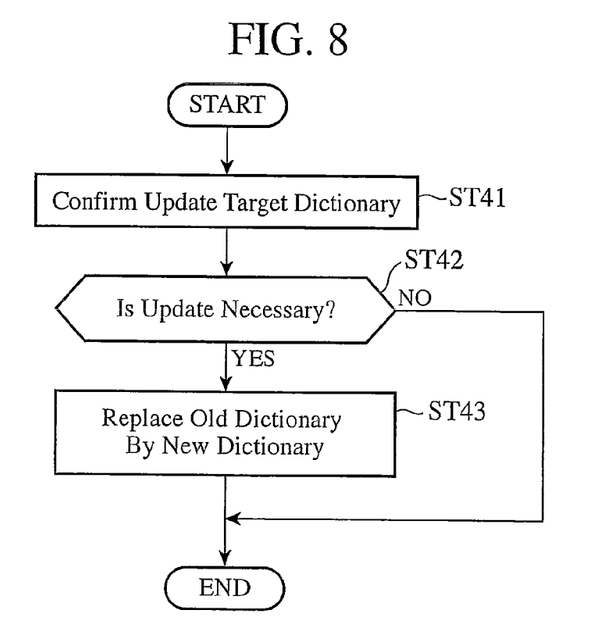
FIG. 8 is a flowchart showing the operation of the voice recognition system of the embodiment 4 in accordance with the present invention centering on dictionary update processing.

Next, the operation of the voice recognition system of the embodiment 4 in accordance with the present invention with the foregoing configuration will be described with reference to the flowchart of FIG. 8 centering on the dictionary update processing executed by the dictionary update unit 10. Incidentally, as for the operation other than the dictionary update processing, it is the same as that of the voice recognition system of the embodiment 1.

In the dictionary update processing, confirmation of the update target dictionary is made (step ST41). More specifically, the dictionary update unit 10 confirms the version of the second voice recognition dictionary 2*b* and the version of the update voice recognition dictionary 11*a* read from the PC card 11. Subsequently, it checks whether the update is necessary or not (step ST42). More specifically, the dictionary update unit 10 checks whether the version of the second voice recognition dictionary 2*b* is older than the version of the update voice recognition dictionary 11*a* read from the PC card 11.

If a decision is made that the update is unnecessary at this step ST42, the dictionary update processing is completed. On the other hand, if a decision is made at step ST42 that the update is necessary, then the old dictionary is replaced by the new dictionary (step ST43). More specifically, the dictionary update unit 10 replaces the existing second voice recognition dictionary 2*b* by the update voice recognition dictionary 11*a* read from the PC card 11, and makes it the new second voice recognition dictionary 2*b*. After that, the dictionary update processing is completed.

As described above, the voice recognition system of the embodiment 4 in accordance with the present invention is configured in such a manner that it can update the second voice recognition dictionary 2*b*. The update makes it possible to recognize a word of the non-navig. search target genre, which cannot be recognized by the old second voice recognition dictionary 2*b* such as a word "shoe store". Thus, the voice recognition system can add the vocabulary outside the navig. search target genre the user is likely to utter. Accordingly, when a new genre appears with the change of the times and the like, it can add the new genre.

Embodiment 5

Figure 9:
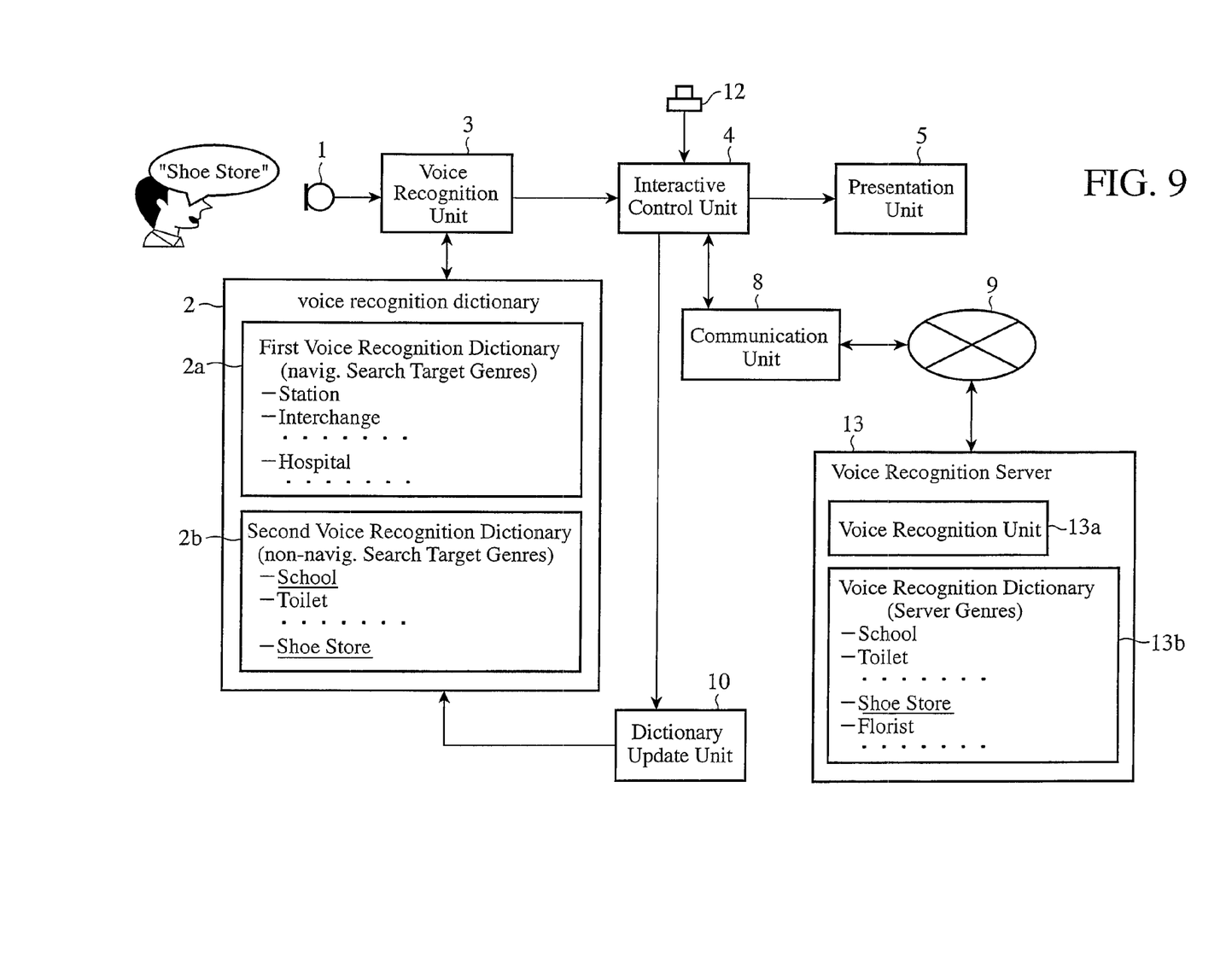
FIG. 9 is a block diagram showing a configuration of a car navigation system to which a voice recognition system of an embodiment 5 in accordance with the present invention is applied.

FIG. 9 is a block diagram showing a configuration of the voice recognition system of an embodiment 5 in accordance with the present invention. The voice recognition system is configured by adding a communication unit 8, a correcting switch 12 and a voice recognition server 13 connected to the network 9 to the voice recognition system of the embodiment 4 and by altering the functions of the interactive control unit 4 and dictionary update unit 10. It will now be described centering on portions different from the embodiment 4.

The correcting switch 12 is used to instruct correction of the recognition result by the voice recognition unit 3. An operation signal representing the presence or absence of a manipulation of the correcting switch 12 is delivered to the interactive control unit 4. Unless the operation signal delivered from the correcting switch 12 indicates that the correcting switch 12 is manipulated, the interactive control unit 4 performs the same operation as that of the voice recognition system of the embodiment 1. On the other hand, if the operation signal delivered from the correcting switch 12 indicates that the correcting switch 12 is manipulated, the interactive control unit 4 extracts the spoken data retained in the voice recognition unit 3 and delivers it to the communication unit 8. In addition, it delivers the update voice recognition dictionary sent from the communication unit 8 (which will be described later) to the dictionary update unit 10.

The communication unit 8 controls the communication between the interactive control unit 4 and the voice recognition server 13 via the network 9 in response to the instructions from the interactive control unit 4. To be concrete, the communication unit 8 transmits the spoken data and second voice recognition dictionary 2*b* delivered from the interactive control unit 4 to the voice recognition server 13 via the network 9. In addition, it transfers the update voice recognition dictionary transmitted from the voice recognition server 13 to the interactive control unit 4. The dictionary update unit 10 replaces the existing second voice recognition dictionary 2*b* by the update voice recognition dictionary delivered from the interactive control unit 4 and employs it as the new second voice recognition dictionary 2*b*.

The voice recognition server 13 has a voice recognition unit 13*a* and a voice recognition dictionary 13*b*. The voice recognition dictionary 13*b* stores, besides the vocabularies outside the navig. search target genres stored in the second voice recognition dictionary 2*b*, vocabularies of other genres (called "server genres" from now on). FIG. 9 shows an example of adding a genre of words such as "shoe store" and "florist" to the vocabulary of the second voice recognition dictionary 2*b* of the embodiment 1.

The voice recognition unit 13*a* collates the spoken data delivered from the communication unit 8 via the network 9 with the vocabulary stored in the voice recognition dictionary 13*b* to recognize the speech indicated by the spoken data. When the voice recognition unit 13*a* can recognize the speech indicated by the spoken data, and unless the vocabulary corresponding to the spoken data is included in the second voice recognition dictionary 2*b* of the voice recognition system received from the communication unit 8 via the network 9, the voice recognition unit 13*a* generates the update voice recognition dictionary including the vocabulary used for the voice recognition of the spoken data, and transmits it to the communication unit 8 via the network 9.

Next, the operation of the voice recognition system of the embodiment 5 in accordance with the present invention with the foregoing configuration will be described. First, with reference to the flowchart of FIG. 10, it will be described centering on the interactive control processing executed by the interactive control unit 4. Incidentally, as for the steps executing the same processing as those of the voice recognition system of the embodiment 1, they are designated by the same reference symbols as those used in the embodiment 1 and their description will be simplified.

Figure 10:
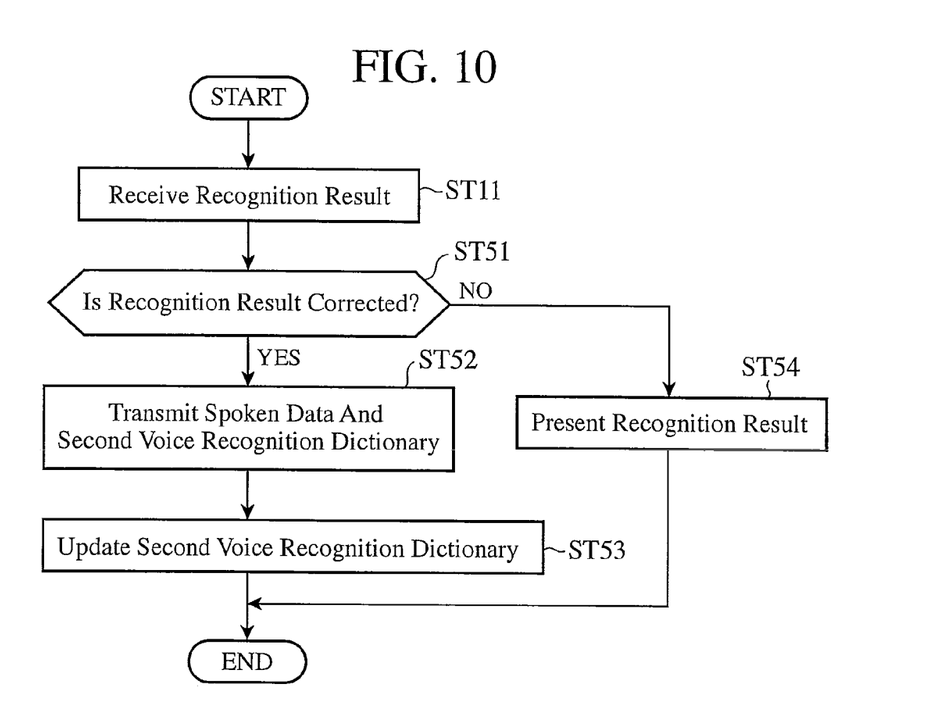
FIG. 10 is a flowchart showing the operation of the voice recognition system of the embodiment 5 in accordance with the present invention centering on interactive control processing.

In the interactive control processing, the recognition result is received, first (step ST11). Subsequently, a check is made as to whether the recognition result has been corrected or not (step ST51). More specifically, the interactive control unit 4 checks whether the operation signal delivered from the correcting switch 12 indicates that the correcting switch 12 is manipulated or not. If a decision is made at step ST51 that the recognition result is not corrected, the recognition result is presented (step ST54). After that, the operation of the voice recognition system is completed.

On the other hand, if a decision is made at step ST51 that the recognition result has been corrected, the spoken data and second voice recognition dictionary are transmitted (step ST52). More specifically, the interactive control unit 4 acquires the spoken data and second voice recognition dictionary 2*b* retained in the voice recognition unit 3, and delivers them to the communication unit 8. The communication unit 8 transmits the spoken data and second voice recognition dictionary 2*b* delivered from the interactive control unit 4 to the voice recognition server 13 via the network 9. In response to it, the voice recognition server 13 generates the update voice recognition dictionary and transmits it to the communication unit 8 via the network 9. Details of the processing the voice recognition server 13 executes will be described later.

Subsequently, the second voice recognition dictionary is updated (step ST53). More specifically, the communication unit 8 receives a dictionary update request accompanying the update voice recognition dictionary, which is transmitted from the voice recognition server 13 via the network 9, and delivers it to the interactive control unit 4. The interactive control unit 4 delivers the update voice recognition dictionary it receives from the communication unit 8 to the dictionary update unit 10. The dictionary update unit 10 replaces the existing second voice recognition dictionary 2*b* by the update voice recognition dictionary delivered from the interactive control unit 4, and employs it as a new second voice recognition dictionary 2*b*. After that, the operation of the voice recognition system is completed.

Figure 11:
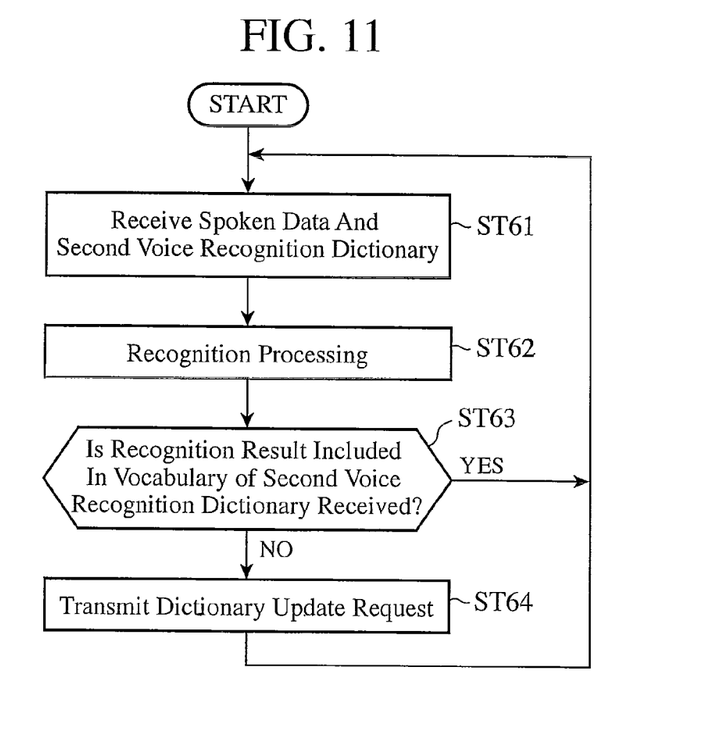
FIG. 11 is a flowchart showing the operation of the voice recognition system of the embodiment 5 in accordance with the present invention centering on the processing executed by a voice recognition server.

Next, details of the processing performed by the voice recognition server 13 will be described with reference to the flowchart shown in FIG. 11. The voice recognition server 13 receives the spoken data and second voice recognition dictionary, first (step ST61). More specifically, the voice recognition server 13 receives the spoken data and second voice recognition dictionary 2*b* transmitted from the communication unit 8 of the voice recognition system via the network 9. The spoken data and second voice recognition dictionary 2*b* are delivered to the voice recognition unit 13*a*.

Subsequently, the recognition processing is executed (step ST62). More specifically, the voice recognition unit 13*a* collates the spoken data received at step ST61 with the vocabulary stored in the voice recognition dictionary 13*b* to recognize the speech indicated by the spoken data. Subsequently, a check is made as to whether or not the recognition result at step ST62 is contained in the vocabulary of the second voice recognition dictionary received (step ST63). More specifically, the voice recognition unit 13*a* checks whether the word recognized at step ST62 is contained in the second voice recognition dictionary 2*b* received at step ST61. If a decision is made at step ST63 that the recognition result is contained in the vocabulary of the second voice recognition dictionary received, it is understood that a mere recognition error occurs in the voice recognition system. Thus, the sequence returns to step ST61 to repeat the foregoing processing.

On the other hand, unless a decision is made at step ST63 that the recognition result at step ST62 is contained in the vocabulary of the second voice recognition dictionary received, a dictionary update request is transmitted (step ST64). More specifically, the voice recognition unit 13*a* creates the update voice recognition dictionary including the vocabulary of the recognition result, and transmits a dictionary update request accompanying it to the voice recognition system. After that, the sequence returns to step ST61. Then, the processing in the voice recognition server 13 is completed.

A concrete example carried out by the foregoing processing will be described. For example, if a word "shoe store" of a genre not stored in the genre database of the car navigation system 6*a* is spoken, the voice recognition unit 3 cannot recognize the uttered "shoe store" unless the second voice recognition dictionary 2*b* contains the word "shoe store". In this case, a user manipulates the correcting switch 12 to instruct the correction. This allows the spoken data representing the "shoe store" and the second voice recognition dictionary 2b to be transmitted to the voice recognition server 13. The voice recognition server 13 executes the voice recognition processing of the spoken data. Unless the word "shoe store" obtained as a result of the recognition is contained in the vocabulary of the second voice recognition dictionary 2b received from the voice recognition system, the update voice recognition dictionary including the word "shoe store" is created and transmitted to the voice recognition system. The voice recognition system replaces the existing second voice recognition dictionary 2b by the update voice recognition dictionary it receives and employs it as a new second voice recognition dictionary 2b. This enables the voice recognition system to correctly recognize the "shoe store" from that time on.

As described above, according to the voice recognition system of the embodiment 5 in accordance with the present invention, unless the input speech is correctly recognized, it can estimate the speech content by having the voice recognition server 13 recognize the spoken data representing the speech, create the update voice recognition dictionary including the vocabulary, and register it as the second voice recognition dictionary 2b of the voice recognition system of the car navigation system using the functions of the dictionary update unit 10. This enables efficient update of the second voice recognition dictionary 2b of the car navigation system.

Incidentally, although the voice recognition system of the foregoing embodiment 5 is configured in such a manner that the spoken data and second voice recognition dictionary 2b are transmitted to the voice recognition server 13, and that the voice recognition server 13 executes the voice recognition processing using the voice recognition dictionary of genres for the server, creates, if it can recognize the spoken data, the update voice recognition dictionary containing the recognized word, and sends it back to the voice recognition system, this is not essential. For example, the voice recognition system can also be configured in such a manner that only the spoken data is transmitted to the voice recognition server 13, that the voice recognition server 13 executes the voice recognition processing using the voice recognition dictionary of the genres for the server, sends, when the spoken data can be recognized, the recognized word back to the voice recognition system, and that the voice recognition system creates the update voice recognition dictionary including the word sent back, and updates the second voice recognition dictionary 2b. The configuration can reduce the amount of data transferred between the voice recognition system and the voice recognition server 13.

INDUSTRIAL APPLICABILITY

As described above, the voice recognition system in accordance with the present invention is suitably applied to onboard car navigation systems and the like because it collates the speech sounds with the first voice recognition dictionary, which stores the vocabulary of the search target genres, and with the second voice recognition dictionary, which stores the vocabulary outside the search target genres, and when it recognizes that the speech sounds belong to the vocabulary of the second voice recognition dictionary, it presents a message so stating, thereby enabling the user to use the voice recognition function without any uncomfortable feeling.

What is claimed is:

1. A voice recognition system used for onboard equipment having a genre database that stores search target vocabularies in accordance with respective genres, the voice recognition system comprising:

a microphone for converting speech sounds to an electric signal, and for outputting the electric signal as spoken data;

a first voice recognition dictionary that stores words representing search target genres in the genre database;

a second voice recognition dictionary that stores words not representing search target genres in the genre database;

a voice recognition unit for recognizing the speech sounds by collating the spoken data delivered from the microphone with the words contained in the first voice recognition dictionary and in the second voice recognition dictionary;

a controller programmed to:

when a word delivered from the voice recognition unit as the recognition result indicates one of the genres stored in the first voice recognition dictionary, decide that a search is to be conducted of the target vocabulary corresponding to the recognized genre in the genre database, and when a word delivered from the voice recognition unit as the recognition result is a word obtained by collating the spoken data with the words contained in the second voice recognition dictionary, generate a message stating that the word is not a word of a search target genre as presentation information; and a presentation unit for presenting the presentation information delivered from the controller to a user.

2. The voice recognition system according to claim 1, further comprising:

a name database that stores search target vocabularies under respective names; and a retrieval unit for searching the name database using the word delivered from the controller as a retrieval key, and for sending words which are obtained by the search and include the retrieval key back to the controller, wherein the controller is further programmed to:

when the word delivered from the voice recognition unit as a recognition result is a word obtained by collating the spoken data with the words contained in the second voice recognition dictionary, initiate the search of the name database by delivering the word to the retrieval unit, and generate as the presentation information the words which includes the retrieval key and are sent back from the retrieval unit in response to the instruction.

3. The voice recognition system according to claim 1, further comprising:

a communication unit for executing a network search using the word delivered from the controller as a keyword, and for sending words including the keyword obtained by the network search back to the interactive control unit, wherein the controller is further programmed to:

initiate, when the word delivered from the voice recognition unit as a recognition result is a word obtained by collating the spoken data with the words contained in the second voice recognition dictionary, the network search by delivering the word to the communication unit, and outputs generate as at least part of the presentation information the words which include the keyword and are sent back from the retrieval unit in response to the network search.

4. The voice recognition system according to claim 1, further comprising a dictionary update unit for preparing a new second voice recognition dictionary by replacing the existing second voice recognition dictionary by an update voice recognition dictionary obtained from outside the system.

5. The voice recognition system according to claim 4, further comprising:
   a recognition correcting component for issuing an instruction to correct the recognition result delivered from the voice recognition unit; and
   a communication unit for transmitting the spoken data delivered from the microphone via the controller to a voice recognition server via a network in response to the instruction from the recognition correcting component, for receiving from the voice recognition server via the network the update voice recognition dictionary generated in a manner as to include a vocabulary used when the voice recognition server is able to recognize the spoken data, and for sending the update voice recognition dictionary back to the controller, wherein
   the dictionary update unit acquires the update voice recognition dictionary from the controller, and prepares the new second voice recognition dictionary by replacing the existing second voice recognition dictionary with the update voice recognition dictionary acquired.

6. A voice recognition system for onboard equipment having a genre database that stores search target vocabularies in accordance with respective genres, the voice recognition system comprising:
   a microphone for converting speech sounds to an electric signal, and for outputting the electric signal as spoken data;
   a first voice recognition dictionary that stores words representing search target genres in the genre database;
   a second voice recognition dictionary that stores words not representing search target genres in the genre database;
   a voice recognition unit for recognizing the speech sounds by collating the spoken data delivered from the microphone with the words contained in the first voice recognition dictionary and in the second voice recognition dictionary;
   an interactive control unit for outputting, when a word delivered from the voice recognition unit as a recognition result is a word obtained by collating the spoken data with the words contained in the second voice recognition dictionary, a message stating that the word is not a word of a search target genre as presentation information;
   a presentation unit for presenting the presentation information delivered from the interactive control unit to a user;
   a name database that stores search target vocabularies under respective names; and
   a retrieval unit for searching the name database using the word delivered from the interactive control unit as a retrieval key, and for sending words which are obtained by the search and include the retrieval key back to the interactive control unit, wherein
   the interactive control unit initiates, when the word delivered from the voice recognition unit as a recognition result is a word obtained by collating the spoken data with the words contained in the second voice recognition dictionary, the search by delivering the word to the retrieval unit, and outputs as the presentation information the word which includes the retrieval key and is sent back from the retrieval unit in response to the instruction.

7. A voice recognition method for use with onboard equipment having a genre database that stores search target vocabularies in accordance with respective genres, the method comprising:
   using a microphone to convert speech sounds to an electric signal, and output the electric signal as spoken data;
   storing in a first voice recognition dictionary words representing search target genres in the genre database;
   storing in a second voice recognition dictionary words not representing search target genres in the genre database;
   recognizing the speech sounds by collating the spoken data delivered from the microphone with the words contained in the first voice recognition dictionary and in the second voice recognition dictionary;
   when the recognition result is a word indicating one of the genres stored in the first voice recognition dictionary, decide that a search is to be conducted of the target vocabulary corresponding to the recognized genre in the genre database, and
   when the recognition result is a word obtained by collating the spoken data with the words contained in the second voice recognition dictionary, generate a message stating that the word is not a word of a search target genre as presentation information, and present the presentation information to a user.

8. The method according to claim 7, further comprising:
   storing in a name database target vocabularies under respective names; and
   searching the name database using the recognized word as a retrieval key to retrieve words that include the retrieval key, wherein
   the name database search is initiated when the recognition result is a word obtained by collating the spoken data with the words contained in the second voice recognition dictionary, and the presentation information includes the retrieved words including the retrieval key.

9. The method according to claim 7, further comprising:
   executing a network search using the recognition result as a keyword to retrieve words including the keyword, wherein
   the network search is initiated when the recognition result is a word obtained by collating the spoken data with the words contained in the second voice recognition dictionary, and
   the presentation information includes the retrieved words including the keyword.

10. The method according to claim 7, further comprising:
    preparing a new second voice recognition dictionary by replacing the existing second voice recognition dictionary by an update voice recognition dictionary obtained externally.

11. The method according to claim 10, further comprising:
    utilizing a recognition correcting component to issue an instruction to correct the recognition result;
    transmitting the spoken data delivered from the microphone to a voice recognition server via a network in response to the instruction; and
    receiving from the voice recognition server via the network the update voice recognition dictionary, which includes a vocabulary to be used when the voice recognition server is able to recognize the spoken data, wherein
    the new second voice recognition dictionary is prepared by replacing the existing second voice recognition dictionary with the update voice recognition dictionary.

* * * * *